(12) United States Patent
Yun et al.

(10) Patent No.: US 11,392,704 B2
(45) Date of Patent: Jul. 19, 2022

(54) APPARATUS FOR LAN BOOTING ENVIRONMENT-BASED FILE SECURITY AND CENTRALIZATION, METHOD THEREFOR, AND COMPUTER-READABLE RECORDING MEDIUM ON WHICH PROGRAM FOR PERFORMING SAME METHOD IS RECORDED

(71) Applicant: ESTSECURITY CORP., Seoul (KR)

(72) Inventors: Kwon Young Yun, Seoul (KR); Jong Been Lim, Namyangju-si (KR)

(73) Assignee: ESTSECURITY CORP., Seoul (KR)

( * ) Notice: Subject to any disclaimer, the term of this patent is extended or adjusted under 35 U.S.C. 154(b) by 51 days.

(21) Appl. No.: 16/967,939

(22) PCT Filed: Mar. 6, 2018

(86) PCT No.: PCT/KR2018/002606
§ 371 (c)(1),
(2) Date: Aug. 6, 2020

(87) PCT Pub. No.: WO2019/156279
PCT Pub. Date: Aug. 15, 2019

(65) Prior Publication Data
US 2021/0256134 A1 Aug. 19, 2021

(30) Foreign Application Priority Data
Feb. 6, 2018 (KR) .................. 10-2018-0014402

(51) Int. Cl.
*G06F 15/177* (2006.01)
*G06F 9/00* (2006.01)
(Continued)

(52) U.S. Cl.
CPC ............ *G06F 21/575* (2013.01); *G06F 9/441* (2013.01); *G06F 9/4416* (2013.01);
(Continued)

(58) Field of Classification Search
CPC ...... G06F 21/575; G06F 9/441; G06F 9/4416; G06F 11/1451; G06F 21/556;
(Continued)

(56) References Cited

U.S. PATENT DOCUMENTS 6,421,777 B1 * 7/2002 Pierre-Louis ......... G06F 9/4416
713/2
7,882,345 B1 * 2/2011 Christensen .......... G06F 9/4416
713/2
(Continued)

FOREIGN PATENT DOCUMENTS

JP 2009-176213 A 8/2009
JP 2014-174878 A 9/2014
(Continued)

*Primary Examiner* — Xuxing Chen
(74) *Attorney, Agent, or Firm* — Novick, Kim & Lee, PLLC; Jae Youn Kim

(57) ABSTRACT

An apparatus for LAN booting environment-based file security and centralization, a method therefor, and a computer-readable recording medium recorded with a program for performing the method are proposed. The apparatus can include a central server including a storage module for storing a plurality of operating system images; a communication module for communicating with a user device; and a LAN booting management module configured to, when receiving a LAN booting start request message from the user device through the communication module, select an operating system image that can be used in the user device among the plurality of operating systems according to user device information, and transmit the selected operating system image, a user apparatus corresponding to the same, a method for LAN booting environment-based file security and centralization of these devices, and a computer-readable recording medium recorded with a program for performing the method.

16 Claims, 5 Drawing Sheets

(51) Int. Cl.
  *G06F 21/57*   (2013.01)
  *G06F 9/4401*  (2018.01)
  *G06F 11/14*   (2006.01)
  *G06F 21/55*   (2013.01)
  *H04L 12/28*   (2006.01)
(52) U.S. Cl.
  CPC ........ *G06F 11/1451* (2013.01); *G06F 21/556* (2013.01); *H04L 12/28* (2013.01); *G06F 2201/80* (2013.01); *G06F 2221/034* (2013.01)
(58) Field of Classification Search
  CPC .......... G06F 2201/80; G06F 2221/034; G06F 21/6218; G06F 21/51; G06F 21/55; H04L 12/28
  See application file for complete search history.

(56) References Cited

U.S. PATENT DOCUMENTS

| | | | | |
|---|---|---|---|---|
| 2001/0042045 | A1* | 11/2001 | Howard | G06F 21/6209 705/51 |
| 2002/0016909 | A1* | 2/2002 | Miyajima | G06F 9/4416 713/2 |
| 2004/0193867 | A1* | 9/2004 | Zimmer | G06F 9/4416 713/2 |
| 2005/0283606 | A1* | 12/2005 | Williams | G06F 9/4416 713/166 |
| 2006/0117172 | A1* | 6/2006 | Zhang | G06F 9/4416 713/2 |
| 2010/0299759 | A1* | 11/2010 | Kim | G06F 21/52 726/28 |
| 2012/0117611 | A1* | 5/2012 | Wookey | G06F 21/10 726/1 |
| 2012/0226913 | A1* | 9/2012 | Park | G06F 21/556 713/189 |
| 2016/0055336 | A1* | 2/2016 | Ryu | G06F 21/562 726/23 |
| 2016/0063264 | A1* | 3/2016 | Baek | G06F 21/602 713/165 |
| 2018/0198619 | A1* | 7/2018 | Zhang | G06F 21/51 |

FOREIGN PATENT DOCUMENTS

| | | |
|---|---|---|
| KR | 2011-0112002 A | 10/2011 |
| KR | 10-2013-0024221 A | 3/2013 |
| KR | 10-2014-0044961 A | 4/2014 |
| KR | 10-2015-0102388 A | 9/2015 |

\* cited by examiner

APPARATUS FOR LAN BOOTING
ENVIRONMENT-BASED FILE SECURITY
AND CENTRALIZATION, METHOD
THEREFOR, AND COMPUTER-READABLE
RECORDING MEDIUM ON WHICH
PROGRAM FOR PERFORMING SAME
METHOD IS RECORDED

TECHNICAL FIELD

The present invention relates to file security and centralization techniques, and more specifically, to an apparatus for LAN booting environment-based file security and centralization, a method therefor, and a computer-readable recording medium recorded with a program for performing the method.

BACKGROUND ART

A concept of enterprise content management (ECM), in which all files produced and distributed in companies are systematically managed to enhance security and facilitate collaboration, is being strengthened. Ransomware is a malicious program which encrypts files such as documents and photos stored in a PC without permission to prevent them from being opened, and requires money as a reward for breaking the code. Recently, a technique thereof has been progressed, for example, attacks of ransomware targeting companies has been occurring.

PRIOR ART DOCUMENT

[Patent Document] Korean Patent Laid-Open Publication No. 2011-0112002 (published on Oct. 12, 2011, title of the invention: a document centralization method in a document management system)

SUMMARY OF INVENTION

Problems to be Solved by Invention

It is an object of the present invention to provide an apparatus which may centralize running applications and files after performing LAN booting, thus to prevent the file or information on the file from being leaked to an outside or the localized file from being attacked, a method therefor, and a computer-readable recording medium recorded with a program for performing the method.

Means for Solving Problems

To achieve the above-described object, according to an aspect of the present invention, there is provided a central server for LAN booting environment-based file security and centralization, the central server including: a storage module configured to store a plurality of operating system images; a communication module configured to communicate with a user device; and a LAN booting management module configured to, when receiving a LAN booting start request message from the user device through the communication module, select an operating system image usable in the user device among the plurality of operating systems according to user device information, and transmit the selected operating system image to the user device through the communication module.

The storage may include at least one of a program list that allows the user device to block a function of leaking information among functions of an application belonging to the program list, and an extension list that allows the user device to block information of a file having an extension included in the extension list from being leaked. Thereby, the central server may further include a file centralization management module configured to, when receiving the security list request message from the user device through the communication module, transmit at least one of the program list and the extension list corresponding to the user device to the user device through the communication module.

The storage module may include a plurality of network disks. Thereby, the central server may further include a file centralization management module configured to, when receiving a storage area request message from the user device through the communication module, allocate an available network disk among the plurality of network disks, transmit a link of the allocated network disk to the user device through the communication module, and connect the central server with the user device through the link of the allocated network disk so that a file generated in the user device is stored in the allocated network disk.

The file centralization management module may back up the files stored in the network disk at a predetermined cycle with different versions, and when the file stored in the network disk is deleted or modified, restore or restore the deleted or modified file to a previous version of the file.

To achieve the above-described object, according to another aspect of the present invention, there is provided a user device for LAN booting environment-based file security and centralization, the user device including: a communication unit configured to communicate with a central server; a LAN booting support module configured to, when receiving an operating system image from the central server through the communication unit, perform booting by using the received operating system image; and a local storage prevention module configured to, when receiving at least one of a program list and an extension list through the communication unit after the booting is completed, block a function of leaking information among functions of an application belonging to the program list, or block information of a file having an extension included in the extension list from being leaked.

The local storage prevention module may block a file of an application included in the program list or the file having the extension included in the extension list from being stored in an area other than a network storage area, block clipboard copy and screen capture of the application included in the program list or the file having the extension included in the extension list, block a function of attaching or transmitting a file or a link of the file by the application included in the program list, or block the file having the extension included in the extension list or the link of the file from being attached or transmitted.

The local storage prevention module may perform file I/O filtering in a kernel mode to block information leakage through a function of the application included in the program list, or block information leakage of the file having the extension included in the extension list.

The user device may further include a network driver connection module configured to, when receiving a link of a network disk from the central server through the communication unit after the booting is completed, connect the user device to the network disk through the link of the received network disk so that a file generated in the user device is stored in the connected network disk.

The network driver connection module may connect the user device with the network disk to which a distributed file system dedicated to the network driver connection module is applied.

To achieve the above-described object, according to another aspect of the present invention, there is provided a method for LAN booting environment-based file security and centralization of a central server, the method including: receiving a LAN booting start request message from a user device; selecting an operating system image usable in the user device among a plurality of operating systems according to user device information; and transmitting the selected operating system image to the user device.

The method may further include: after the step of transmitting, when receiving a security list request message from the user device, transmitting at least one of a program list and an extension list to the user device, so as to block a function of leaking information among functions of an application belonging to the program list by the user device, or block information of a file having an extension included in the extension list from being leaked by the user device.

The method may further include: after the step of transmitting, when receiving a storage area request message from the user device, allocating an available network disk among the plurality of network disks, and transmitting a link of the allocated network disk to the user device; and connecting the central server with the user device through the link of the allocated network disk so that a file generated in the user device is stored in the allocated network disk.

The method may further include: after the connecting step, backing up the files stored in the network disk at a predetermined cycle with different versions; and when the file stored in the network disk is deleted or modified, recovering or restoring the deleted or modified file to a previous version of the file.

To achieve the above-described object, according to another aspect of the present invention, there is provided a method for LAN booting environment-based file security and centralization of a user device, the method including: receiving an operating system image from a central server; perform booting by using the received operating system image; receiving at least one of a program list and an extension list after the booting is completed; and blocking a function of leaking information among functions of an application belonging to the program list, or block information of a file having an extension included in the extension list from being leaked.

The blocking step may block a file of an application included in the program list or the file having the extension included in the extension list from being stored in an area other than a network storage area, block clipboard copy and screen capture of the application included in the program list or the file having the extension included in the extension list, block a function of attaching or transmitting a file or a link of the file by the application included in the program list, or block the file having the extension included in the extension list or the link of the file from being attached or transmitted.

The blocking step may perform file I/O filtering in a kernel mode to block information leakage through a function of the application included in the program list, or block information leakage of the file having the extension included in the extension list.

The method may further include: after the step of performing booting, receiving a link of a network disk from the central server; connecting the user device to the network disk through the received link of the network disk; and when a file is generated in the user device, storing the generated file in the connected network disk.

The connecting step may include installing a network driver connection module, which is a network file system driver, to connect the user device with the network disk to which a distributed file system dedicated to the network driver connection module is applied.

In addition, to achieve the above-described object, according to another aspect of the present invention, there is provided a computer readable recording medium recorded with a program for performing a method for LAN booting environment-based file security and centralization of a central server according to aspects of the present invention.

Further, to achieve the above-described object, according to another aspect of the present invention, there is provided a computer-readable recording medium recorded with a program for performing a method for LAN booting environment-based file security and centralization of a user device according to aspects of the present invention.

Advantageous Effects

According to the present invention, files generated in the user device are not stored locally, but are stored in the network storage area of the central server where the security is maintained, that is, in the network disk, thereby it is possible to fundamentally block confidential information of the company from being leaked.

MODE FOR CARRYING OUT INVENTION

Figure 1:
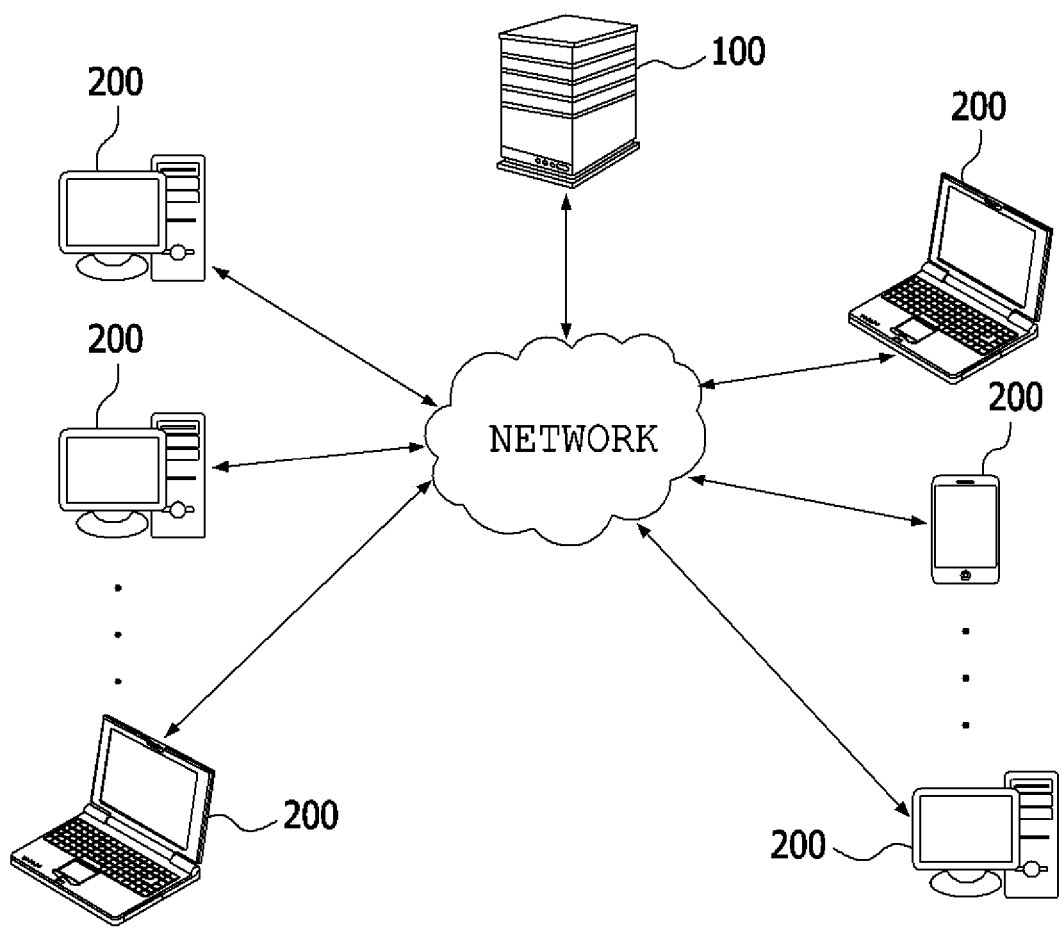
FIG. 1 is a view for describing a configuration of a system for LAN booting environment-based file security and centralization according to an embodiment of the present invention.

To achieve the above-described object, according to an aspect of the present invention, there is provided a central server for LAN booting environment-based file security and centralization, the central server including: a storage module configured to store a plurality of operating system images; a communication module configured to communicate with a user device; and a LAN booting management module configured to, when receiving a LAN booting start request message from the user device through the communication module, select an operating system image usable in the user device among the plurality of operating systems according to user device information, and transmit the selected operating system image to the user device through the communication module.

The storage may include at least one of a program list that allows the user device to block a function of leaking information among functions of an application belonging to the program list, and an extension list that allows the user device to block information of a file having an extension included in the extension list from being leaked. Thereby, the central server may further include a file centralization management module configured to, when receiving the security list request message from the user device through the communication module, transmit at least one of the program list and the extension list corresponding to the user device to the user device through the communication module.

The storage module may include a plurality of network disks. Thereby, the central server may further include a file centralization management module configured to, when receiving a storage area request message from the user device through the communication module, allocate an available network disk among the plurality of network disks, transmit a link of the allocated network disk to the user device through the communication module, and connect the central server with the user device through the link of the allocated network disk so that a file generated in the user device is stored in the allocated network disk.

The file centralization management module may back up the files stored in the network disk at a predetermined cycle with different versions, and when the file stored in the network disk is deleted or modified, restore or restore the deleted or modified file to a previous version of the file.

To achieve the above-described object, according to another aspect of the present invention, there is provided a user device for LAN booting environment-based file security and centralization, the user device including: a communication unit configured to communicate with a central server; a LAN booting support module configured to, when receiving an operating system image from the central server through the communication unit, perform booting by using the received operating system image; and a local storage prevention module configured to, when receiving at least one of a program list and an extension list through the communication unit after the booting is completed, block a function of leaking information among functions of an application belonging to the program list, or block information of a file having an extension included in the extension list from being leaked.

The local storage prevention module may block a file of an application included in the program list or the file having the extension included in the extension list from being stored in an area other than a network storage area, block clipboard copy and screen capture of the application included in the program list or the file having the extension included in the extension list, block a function of attaching or transmitting a file or a link of the file by the application included in the program list, or block the file having the extension included in the extension list or the link of the file from being attached or transmitted.

The local storage prevention module may perform file I/O filtering in a kernel mode to block information leakage through a function of the application included in the program list, or block information leakage of the file having the extension included in the extension list.

The user device may further include a network driver connection module configured to, when receiving a link of a network disk from the central server through the communication unit after the booting is completed, connect the user device to the network disk through the link of the received network disk so that a file generated in the user device is stored in the connected network disk.

The network driver connection module may connect the user device with the network disk to which a distributed file system dedicated to the network driver connection module is applied.

To achieve the above-described object, according to another aspect of the present invention, there is provided a method for LAN booting environment-based file security and centralization of a central server, the method including: receiving a LAN booting start request message from a user device; selecting an operating system image usable in the user device among a plurality of operating systems according to user device information; and transmitting the selected operating system image to the user device.

The method may further include: after the step of transmitting, when receiving a security list request message from the user device, transmitting at least one of a program list and an extension list to the user device, so as to block a function of leaking information among functions of an application belonging to the program list by the user device, or block information of a file having an extension included in the extension list from being leaked by the user device.

The method may further include: after the step of transmitting, when receiving a storage area request message from the user device, allocating an available network disk among the plurality of network disks, and transmitting a link of the allocated network disk to the user device; and connecting the central server with the user device through the link of the allocated network disk so that a file generated in the user device is stored in the allocated network disk.

The method may further include: after the connecting step, backing up the files stored in the network disk at a predetermined cycle with different versions; and when the file stored in the network disk is deleted or modified, recovering or restoring the deleted or modified file to a previous version of the file.

To achieve the above-described object, according to another aspect of the present invention, there is provided a method for LAN booting environment-based file security and centralization of a user device, the method including: receiving an operating system image from a central server; perform booting by using the received operating system image; receiving at least one of a program list and an extension list after the booting is completed; and blocking a function of leaking information among functions of an application belonging to the program list, or block information of a file having an extension included in the extension list from being leaked.

The blocking step may block a file of an application included in the program list or the file having the extension included in the extension list from being stored in an area other than a network storage area, block clipboard copy and screen capture of the application included in the program list or the file having the extension included in the extension list, block a function of attaching or transmitting a file or a link of the file by the application included in the program list, or block the file having the extension included in the extension list or the link of the file from being attached or transmitted.

The blocking step may perform file I/O filtering in a kernel mode to block information leakage through a function of the application included in the program list, or block information leakage of the file having the extension included in the extension list.

The method may further include: after the step of performing booting, receiving a link of a network disk from the central server; connecting the user device to the network disk through the received link of the network disk; and when a file is generated in the user device, storing the generated file in the connected network disk.

The connecting step may include installing a network driver connection module, which is a network file system driver, to connect the user device with the network disk to which a distributed file system dedicated to the network driver connection module is applied.

In addition, to achieve the above-described object, according to another aspect of the present invention, there is provided a computer readable recording medium recorded with a program for performing a method for LAN booting environment-based file security and centralization of a central server according to aspects of the present invention.

Further, to achieve the above-described object, according to another aspect of the present invention, there is provided a computer-readable recording medium recorded with a program for performing a method for LAN booting environment-based file security and centralization of a user device according to aspects of the present invention.

Terms or words used herein should not be construed as limited to a conventional or lexical meaning, and should be understood as appropriate notions by the inventor based on that he/she is able to define terms to describe his/her invention in the best way to be seen by others. Therefore, embodiments described herein and configurations illustrated in the drawings are the most preferable embodiment of the present invention and not exhaustive in terms of the technical idea of the present invention, and it will be understood that various modifications and equivalents may be made to take the place of the embodiments at the application point of the present invention.

Hereinafter, preferred embodiments of the present invention will be described in detail with reference to the accompanying drawings. Herein, it should be noted that the same components are denoted by the same reference numerals in the accompanying drawings. In addition, detailed descriptions of well-known functions and configurations that may make the subject matter of the present invention rather unclear will not be described. For the same reason, in the accompanying drawings, some components are exaggerated, omitted, or schematically illustrated, and the size of each component does not entirely reflect the actual size.

First, a system for LAN booting environment-based file security and centralization according to an embodiment of the present invention will be described. FIG. 1 is a view for describing a configuration of the system for LAN booting environment-based file security and centralization according to the embodiment of the present invention. Referring to FIG. 1, the system for LAN booting environment-based file security and centralization according to the embodiment of the present invention includes a central server 100 and a plurality of user devices 200.

The central server 100 and the plurality of user devices 200 are devices which are booted by an operating system and perform computing operations. The central server 100 may be implemented as at least one device which serves as an application server and a database server. Typically, a computer for a server may be exemplified as the central server. A personal computer may be typically exemplified as the user device 200.

The central server 100 provides an operating system image (for example, an OS iso file) suitable for each of the plurality of user devices 200, so that the user device 200 performs LAN booting. The LAN booting means performing booting by operating an operating system image on a process of the user device 200 rather than an operating system stored and driven in a storage device of the user device 200. Further, the central server 100 provides a program list which is a list of a plurality of applications, and/or an extension list which is a list of a plurality of extensions to the user device 200, so as to prevent information of applications or files executed on the user device 200 from being leaked. In addition, the central server 100 has a network storage area where security is maintained, which is allocated to each of the user devices 200. Then, the user device 200 stores files in the allocated areas and manages them, thereby blocking information leakage.

Figure 2:
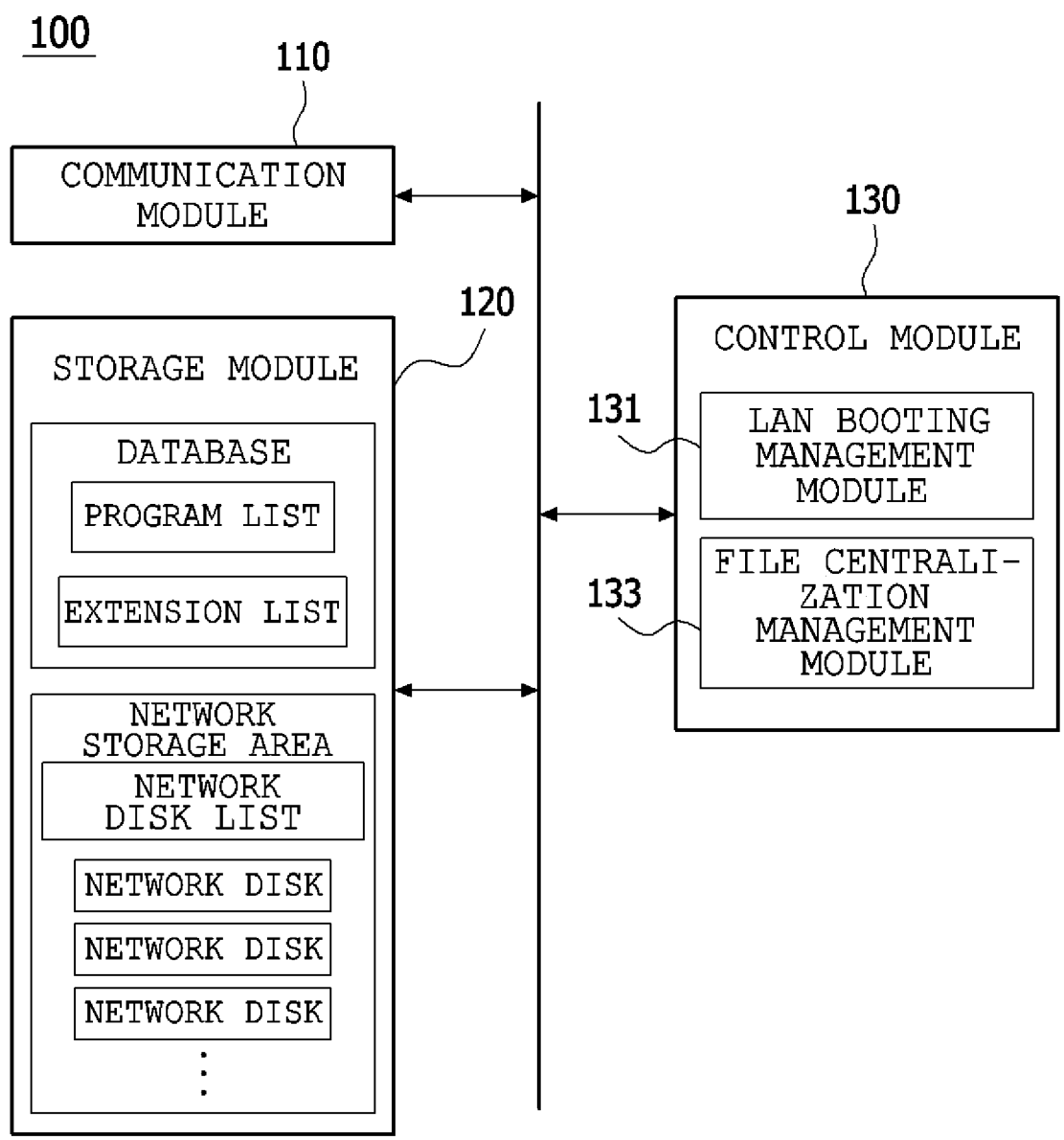
FIG. 2 is a block diagram for describing a configuration of a central server for LAN booting environment-based file security and centralization according to an embodiment of the present invention.

Next, configurations of the respective central server 100 and the user device 200 will be described. First, the configuration of the central server 100 for LAN booting environment-based file security and centralization according to the embodiment of the present invention will be described. FIG. 2 is a block diagram for describing the configuration of the central server for LAN booting environment-based file security and centralization according to the embodiment of the present invention. Referring to FIG. 2, the central server 100 according to the embodiment of the present invention includes a communication module 110, a storage module 120 and a control module 130.

The communication module 110 is configured to communicate with the user device 200 through a network. The communication module 110 may receive data from the user device 200 or transmit the data to the user device 200 according to the control of the control module 130. Such the communication module 110 may be composed of a network interface card. The communication module 110 may include a modem that modulates a transmitted signal and demodulates a received signal in order to transmit and receive data through a network. The communication module 110 may transmit data, for example, a filter driver, a network driver, and various lists, which are received from the control module 130, to the user device 200 through the network. In addition, the communication module 110 may transmit the received data, for example, various messages to the control module 130.

The storage module 120 serves as a database server, and in accordance with the illustrated form, it is illustrated as a device included in the central server 100, but it may be implemented in an independent and separate form. In particular, the storage module 120 includes a plurality of physical storages to provide storage virtualization, and the plurality of physical storages may be logically divided and allocated corresponding to each of the user devices 200.

The storage module 120 serves to store data necessary for an operation of the central server 100. The storage module 120 includes a database area and a network storage area. The database area is an area in which the database is stored, and a database including the program list and/or the extension list is stored therein. The program list includes a plurality of applications. For example, Microsoft's Word, Excel and PowerPoint, Hangul and Computer's Hangul, Microsoft's Explorer, Google's Chrome, and Kakao's Kakao Talk may be included in the program list. The program list allows the user device 200 to block a function of leaking information among functions of an application belonging to the program list. The extension list includes the plurality of extensions. For example, extensions such as doc, hwp, xml, jpg, png, and the like may be included in the extension list. The extension list allows the user device 200 to block information of the file having the extension included in the extension list from being leaked.

The network storage area includes a plurality of network disks. According to a selection of a file centralization management module 133 included in the control module 130, at least one disk among the plurality of network disks may be allocated to the user device 200. The plurality of network disks may be implemented as any one of a plurality of storage media physically divided, at least one storage media logically divided, and at least one storage media physically or logically divided.

Further, the storage module 120 may store user device information corresponding to the user device 200 and a plurality of operating system images. In addition, the storage module 120 stores a LAN booting support module 251, a local storage prevention module 253 and a network driver connection module 255. The LAN booting support module 251, the local storage prevention module 253, and the network driver connection module 255 are transmitted to the user device 200 and installed in the user device 200.

The control module 130 serves as an application server, and in accordance with the illustrated form, it is illustrated as a device included in the central server 100, but it may be implemented in an independent and separate form. The control module 130 controls an overall operation of the central server 100 and a signal flow between internal blocks of the central server 100, and may perform a data processing function for processing the data. The control module 130 may be composed of a central processing unit, a digital signal processor and the like. The control module 130 includes a LAN booting management module 131 and a file centralization management module 133.

The LAN booting management module 131 is configured to select an operating system (OS) suitable for each of the plurality of user devices 200 and perform LAN booting the same. To this end, the LAN booting management module 131 manages a plurality of types of dedicated or general-purpose operating system images (e.g., OS iso files). The operating system image is a compressed type file that can be used by driving the operating system on a processor of the user device 200, without storing the operating system in the user device 200, which is stored and driven in the storage device of the user device 200. Typically, a type of file having an 'iso' extension may be exemplified. In addition, the LAN booting management module 131 manages the user device information such as a hardware standard, an available operating system, IP, and the like for the plurality of user devices 200. For example, the user device information includes address information such as an IP, MAC address, and the like of the user device 200, and version information such as an operating system version, program version and the like. Specifically, the LAN booting management module 131 selects an operating system image that can be driven by the user device 200 at the request of the user device 200, and provides the selected operating system image to the user device 200 through the communication module 110.

The file centralization management module 133 is configured to limit functions of a specific application or a file having a specific extension executed on the user device 200 for security against information leakage. For example, the file centralization management module 133 may control the user device 200 so as not to store the file in a space other than the network storage area, for example, a local storage area of the user device 200. In addition, the file centralization management module 133 controls the user device so as not to store the file, as well as not to perform functions such as screen capture, clipboard copy, and file upload and file attachment through Internet access applications (Explorer, Chrome, Firefox, etc.), messenger programs and the like. To this end, the file centralization management module 133 provides the program list and/or the extension list to the user device 200. Accordingly, when the user device 200 executes a program (application) included in the program list, and/or a file having a file extension included in the extension list, the file centralization management module 133 controls the user device 200 so as not to store the file in the space other than the network storage area, for example, the local storage area thereof, and not to perform the functions such as screen capture, clipboard copy, file upload, file attachment and the like. The network storage area means a storage area of the central server 100, to which security allocated and provided by the file centralization management module 133 is applied. The file centralization management module 133 allocates the network storage area to the network storage module 150 and provides a link corresponding thereto to the user device 200. The user device 200 accesses the central server 100 through the network and stores the file in the network storage area, not an area of the storage device, that is, the local storage area of the user device 200. In addition, the file centralization management module 133 may control the user device 200 so as to store the file only in the network storage area. To this end, the file centralization management module 133 provides the link or address of the network disk in the network storage area to the user device 200. In more detail, the file centralization management module 133 may provide the link so that the user device 200 accesses the network storage area of the central server 100 through the explorer of the operating system or a dedicated connection application to manage the file. Herein, the dedicated connection application refers to a dedicated application that allows the user device to directly access the network storage area, not types of a folder and a disk accessed through the explorer basically provided by the operating system. In addition, the file centralization management module 133 manages a version of the file stored in the network storage area to provide a recovery or restoration function against deletion or modification of the file. The file centralization management module 133 may back up the files stored in the network disk at a predetermined cycle or every time a certain event occurs with different versions of the files. Accordingly, when a file stored in the network disk is deleted or modified, the file centralization management module 133 may recover or restore the deleted or modified file to a previous desired version of the file.

Figure 3:
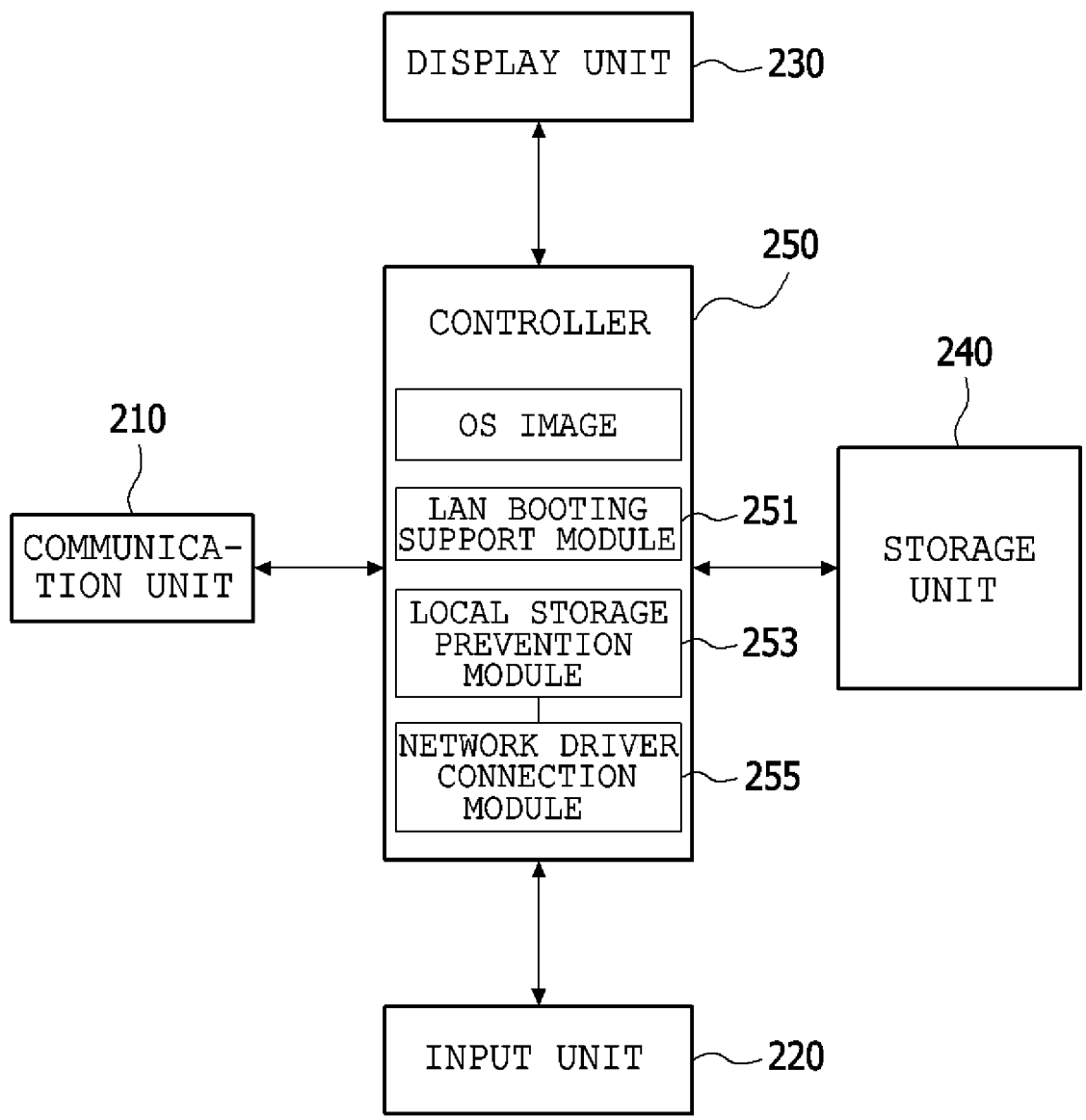
FIG. 3 is a block diagram for describing a configuration of a user device for LAN booting environment-based file security and centralization according to an embodiment of the present invention.

Next, the user device for LAN booting environment-based file security and centralization according to an embodiment of the present invention will be described. FIG. 3 is a block diagram for describing a configuration of the user device for LAN booting environment-based file security and centralization according to the embodiment of the present invention. Referring to FIG. 3, the user device 200 according to the embodiment of the present invention includes a communication unit 210, an input unit 220, a display unit 230, a storage unit 240 and a controller 250.

The communication unit 210 is configured to communicate with the central server 100. Such the communication unit 210 includes a network interface card for communication. The communication unit 210 may include a modem that modulates the transmitted signal and demodulates the received signal in order to transmit and receive data through the network. The communication unit 210 may receive the data from the controller 250 and transmit it to the central server 100. In addition, when receiving the data from the central server 100, the communication unit 210 may transmit it to the controller 250.

The input unit 220 is configured to receive a key operation of a user for controlling various functions and operations of the user device 200, generate an input signal, and transmit the generated input signal to the controller 250. Typically, as the input unit 220, a mouse, a keyboard, and the like may be exemplified. The input unit 220 may include various keys such as a power key to turn on/off the power, character keys, number keys, and direction keys. The function of the input unit 220 may be performed on the display unit 230 when the display unit 230 is implemented as a touch screen. When all functions can be performed only by the display unit 230, the input unit 220 may be omitted.

The display unit 230 may receive data for screen display from the controller 250 and display the received data on the screen. In addition, the display unit 230 may visually provide menus, data, function setting information, and various other information of the user device 200 to a user. When the display unit 230 is formed as a touch screen, the touch screen may perform some or all of the functions of the input unit 220 instead. The display unit 230 may be formed of a liquid crystal display (LCD), organic light emitting diode (OLED), active matrix organic light emitting diode (AMO-LED) or the like.

The storage unit 240 serves to store various data and applications necessary for the operation of the user device 200, and various data generated according to the operation of the user device 200. The storage unit 240 may be composed of devices such as a hard disk, SSD and the like. In addition, the storage unit 240 may store an operating system (OS) for booting and operation of the user device 200. However, when the LAN booting according to the embodiment of the present invention is performed, the operating system stored in the storage unit 240 is not used. Various data stored in the storage unit 240 may be deleted, modified, or added according to the operation of the user. However, when the LAN booting according to the embodiment of the present invention is performed, the data is not stored in the storage unit 240, and operations such as a deletion, modification, and addition are not performed.

The controller 250 may control the overall operation of the user device 200 and the signal flow between the internal blocks of the user device 200, and perform the data processing function to process the data. The controller 250 includes at least one processor of a central processing unit (CPU), an application processor, and a graphic processing unit (GPU).

The controller 250 includes the LAN booting support module 251, the local storage prevention module 253, and the network driver connection module 255. In the following embodiments, the LAN booting support module 251, the local storage prevention module 253 and the network driver connection module 255 are driver type software, and will be described in such a way that these modules are downloaded from the central server 100, installed in the user device 200, and loaded and operated on the controller 250. However, according to an alternative embodiment, the LAN booting support module 251, the local storage prevention module 253, and the network driver connection module 255 may be implemented by hardware, for example, a dedicated processor.

The LAN booting support module 251 is configured to perform LAN booting. When normal booting is performed, the operating system is loaded on the controller 250, and the controller 250 executes the operating system. However, when the LAN booting according to the embodiment of the present invention is performed, booting is performed through the operating system image received from the central server 100, not the operating system of the storage unit 240. That is, the LAN booting support module 251 of the controller 250 executes the operating system image.

The local storage prevention module 253 receives at least one of the program list and/or the extension list from the central server 100 through the communication unit 210, and performs a security function based on the received program list and/or the extension list. That is, the local storage prevention module 253 blocks a function capable of leaking information among functions of an application included in a program list. In addition, the local storage prevention module 253 blocks the file having an extension included in the extension list or information of the file from being leaked. Such the local storage prevention module 253 is implemented in a form of a filter driver, and performs file I/O (input/output or read/write) filtering in a kernel mode. That is, the local storage prevention module 253 performs file I/O filtering in the kernel mode to block information leakage through the function of application included in the program list and/or information leakage of the file having the extension included in the extension list.

In a case of filtering in a user mode, an injection for inserting a code into a program to filter a specific process is required. That is, in order to filter a specific API, an API hooking code is injected into the program. Such an injection technique may be applied only to a limited process for injection depending on an implementation method. Also in a case of an API hooking technique, the hooking code may be executed only in a specific API depending on the implementation method. However, the local storage prevention module 253 according to the embodiment of the present invention is implemented in the form of the filter driver to perform filtering in the kernel mode. That is, the local storage prevention module 253 shares a memory in all processes. Therefore, a process of injecting the hooking code is not required, and a problem, in which file I/O filtering is not performed due to an injection failure in the user mode, does not occur. Therefore, there is an advantage that can minimize a security hole. Moreover, operating systems such as Microsoft's Windows separately manage the user mode and kernel mode for stability, and it is not possible to access a kernel level memory in the user mode. Since the local storage prevention module 253 operates in the kernel mode, the stability of the operating system may be increased. This may minimize a collision problem with other security products, for example, an anti-virus program, compared to a user mode filtering method. Further, in the user mode, a filtering technique through injection is vulnerable to malicious behavior since access to the memory is relatively easy, but the local storage prevention module 253 has strong characteristics against a malicious code since it operates in the kernel mode.

The network driver connection module 255 serves to store the file in the network storage area. The network driver connection module 255 may receive a link or address of the network disk allocated to the user device 200 among the plurality of network disks in the network storage area through the communication unit 210. Then, the network driver connection module 255 connects the link with the corresponding network disk through the link or address of the network disk. Accordingly, the local storage prevention module 253 may store the file of the application included in the program list and/or the file having the extension included in the extension list in the connected network disk with reference to the network driver connection module 255. The network driver connection module 255 may be implemented in a form of a network file system driver. A LAN Manager Redirector-based Windows Network File System of the Windows operating system may only communicate with LAN Manager Server and Samba Server-based systems.

However, the network driver connection module 255 is implemented in the form of the network file system driver, and may connect and communicate with the network disk of the central server 100 to which a distributed file system dedicated to the network driver connection module 255 is applied. Thereby, a temporary file is not generated in the local area and the storage unit 240, such that it is more secure in terms of the security.

In addition, although not shown in the drawings, the user device 200 according to the embodiment of the present invention may include a storage medium insertion unit for inserting an external storage medium such as a memory card to enable data storage, a connection terminal for data exchange with an external digital device, and a charging terminal. Furthermore, the user device 200 may optionally further include functional parts having additional functions such as an audio processor that inputs or outputs an audio signal, a sound signal, and the like through a microphone and a speaker. According to the trend of the convergence of digital devices, since variations of portable devices are very diverse, all variations cannot be enumerated. However, it will be understood by those skilled in the art that a unit of a level equivalent to the above-described units may be further included in the user device 200 according to the present invention.

Figure 4:
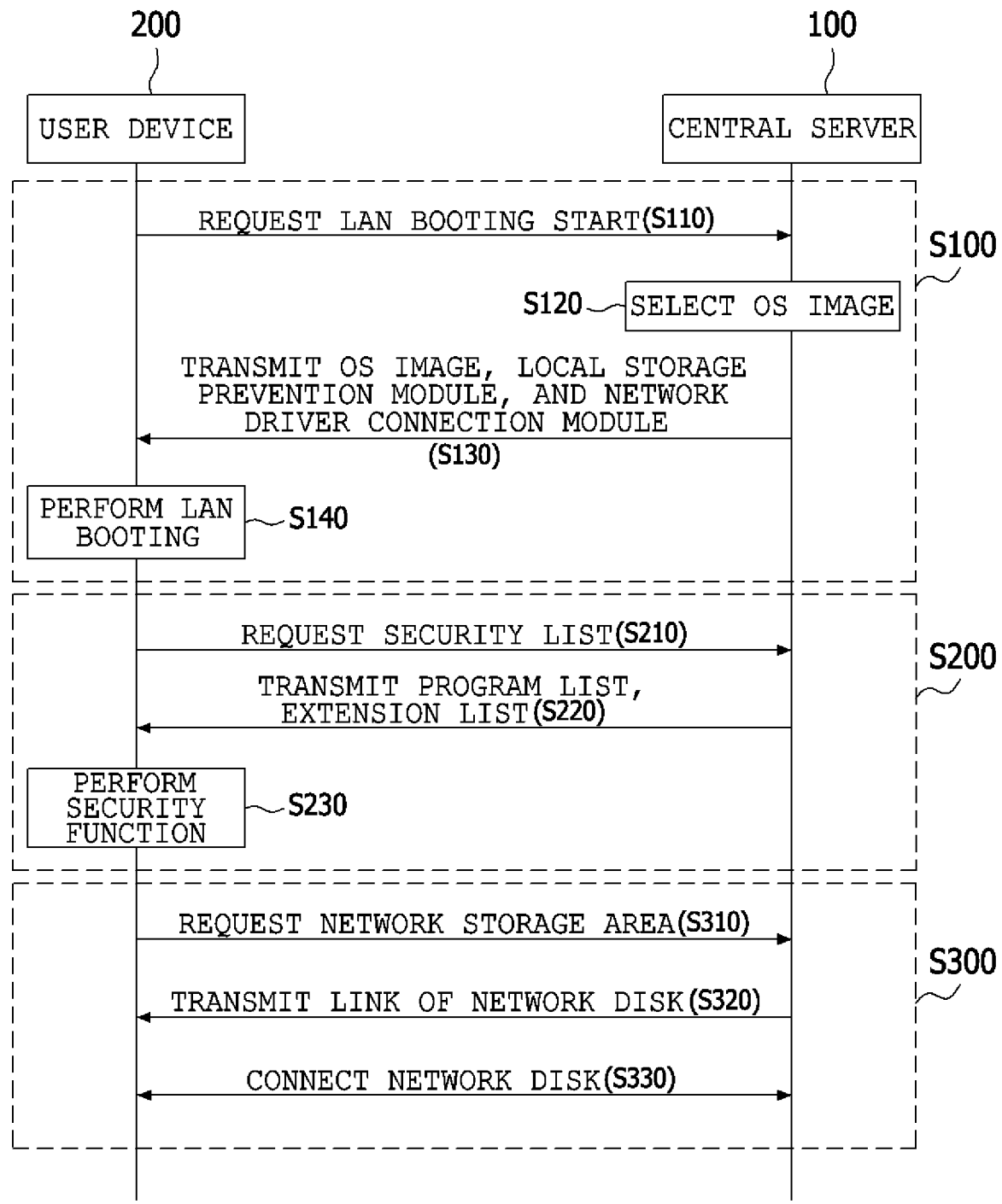
FIG. 4 is a flowchart for describing a method for LAN booting environment-based file security and centralization according to an embodiment of the present invention.
Figure 5:
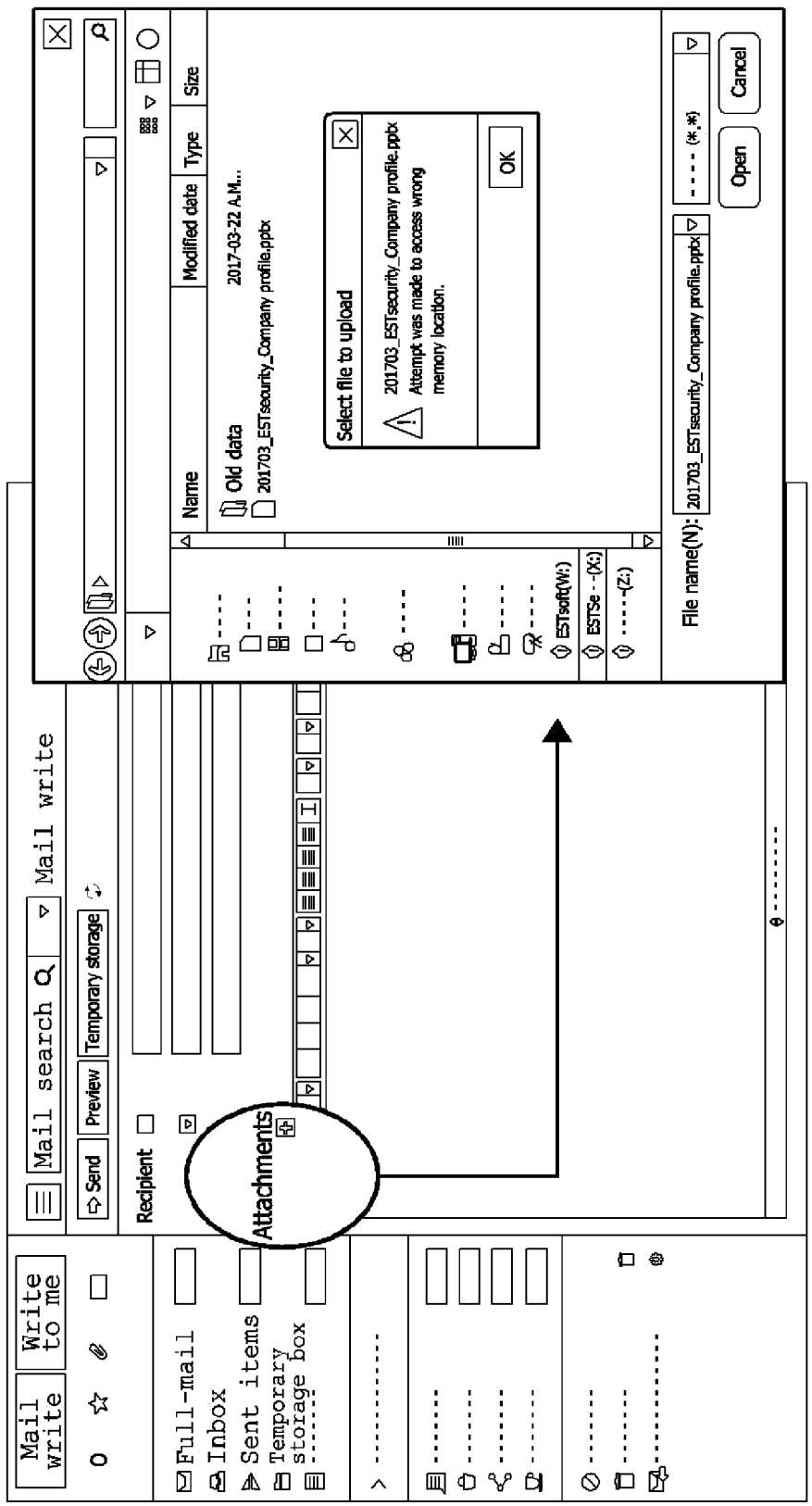
FIG. 5 is a screen example for describing the method for LAN booting environment-based file security and centralization according to the embodiment of the present invention.

Next, a method for LAN booting environment-based file security and centralization according to an embodiment of the present invention will be described. FIG. 4 is a flowchart for describing the method for LAN booting environment-based file security and centralization according to the embodiment of the present invention. In addition, FIG. 5 is a screen example for describing the method for LAN booting environment-based file security and centralization according to the embodiment of the present invention.

Referring to FIG. 4, the central server 100 and the user device 200 performs LAN booting on the user device 200 in step S100. This step S100 includes steps S110 to S140, which will be described in more detail below. When an input from a user is detected by the controller 250 of the user device 200 through the input unit 220 according to an operation of the user, the LAN booting support module 251 of the controller 250 sends a LAN booting start request message to the central server 100 through the communication unit 210 to request LAN booting start in step S110. At this time, the LAN booting start request message may include user device information. The user device information includes address information such as an IP, MAC address, and the like of the user device 200, and version information such as operating system version, program version and the like. Such the user device information may be transmitted to the storage module 120 of the central server 100 in advance to be stored therein.

When receiving the LAN booting start request message through the communication module 110, the LAN booting management module 131 of the control module 130 of the central server 100 selects an OS image usable in the user device 200 among the plurality of OS images stored in the storage module 120 according to the user device information in step S120. Next, the LAN booting management module 131 transmits the local storage prevention module 253 and the network driver connection module 255 including the selected OS image through the communication module 110 to the user device 200 in step S130.

When receiving the OS image, the local storage prevention module 253 and the network driver connection module 255 through the communication unit 210, the controller 250 of the user device 200 installs the local storage prevention module 253 and the network driver connection module 255, then the LAN booting support module 251 of the controller 250 performs booting by using the received OS image in step S140. That is, the LAN booting support module 251 performs LAN booting.

When the above-described LAN booting is completed, the central server 100 and the user device 200 perform the security function for the user device 200 in step S200. This step S200 includes steps S210 to S230, which will be described in more detail below.

The local storage prevention module 253 of the controller 250 transmits a security list request message for requesting at least one of the program list and the extension list to the central server 100 through the communication unit 210 in step S210. Herein, the local storage prevention module 253 performs a function of the filter driver.

When receiving the security list request message from the user device 200 through the communication module 110, the file centralization management module 133 of the control module 130 of the central server 100 extracts at least one of the program list and the extension list corresponding to the user device 200 from the database stored in the storage module 120. Next, the file centralization management module 133 transmits the extracted at least one of the program list and the extension list to the user device 200 through the communication module 110 in step S220.

When receiving the at least one of the program list and the extension list through the communication unit 210, the local storage prevention module 253 of the controller 250 of the user device 200 performs the security function according to the received program list and/or extension list in step S230. That is, the local storage prevention module 253 blocks the function of leaking information among the functions of the application included in the program list. In addition, the local storage prevention module 253 prevents information of a file having the extension included in the extension list from being leaked. Then, specific examples of such a security function will be described below.

The local storage prevention module 253 performs a function of blocking a file of an application included in the program list, which is generated by executing the application, from being stored in an area other than the network storage area. Herein, the area other than the network storage area includes the storage unit 240 of the user device 200, as well as an external storage medium such as a memory card connected to the user device 200. For example, when assuming that Microsoft's 'PowerPoint' belongs to the program list, the local storage prevention module 253 performs the function of blocking files generated by the execution of PowerPoint (e.g., files having extensions such as 'ppt' and 'pptx') from being stored in the area other than the network storage area. In addition, when the application included in the program list is executed and displayed through the display unit 230, the local storage prevention module 253 blocks clipboard copy (e.g., ctrl+c) and screen capture (e.g., Prt sc) with respect to the displayed area. Further, the local storage prevention module 253 blocks an operation of executing an application included in the program list, and attaching and transmitting the file through an additional function of the application. For example, referring to FIG. 5, it is assumed that a browser program, a mail application, or a messenger application belongs to the program list, and the corresponding application has a function of attaching and transmitting a file or a link as an additional function. Therefore, the local storage prevention module 253 blocks the function of attaching and transmitting the file or link of the corresponding application.

The local storage prevention module 253 performs a function of blocking the file having the extension included in the extension list from being stored in the area other than the network storage area. As described above, the area other than the network storage area includes the storage unit 240 of the user device 200, as well as the external storage medium such as a memory card connected to the user device 200. For example, when assuming that a file having an extension of 'ppt' belongs to the extension list, the local storage prevention module 253 performs a function of blocking the file having the extension of 'ppt' from being stored in the area other than the network storage area. In addition, when displaying a file having the extension included in the extension list (e.g., the file having the extension of 'ppt') through the display unit 230, the local storage prevention module 253 blocks the clipboard copy (e.g., ctrl+c) and screen capture (e.g., Prt sc) with respect to the displayed area. Further, the local storage prevention module 253 blocks the file having the extension included in the extension list from being transmitted. For example, referring to FIG. 5, it is assumed that a file having an extension of 'pptx' belongs to the extension list. Then, the local storage prevention module 253 blocks attaching the file having the extension of 'pptx' or a link to the file having the extension of 'pptx' of a specific application, or transmitting the file having the extension of 'pptx' or the link to the file having the extension of 'pptx'.

Meanwhile, it is illustrated that the step S300 is performed after the step S200, but the step S300 may be performed in parallel in terms of time as a separate process from the process of the step S200. The central server 100 and the user device 200 provide the network storage area in which the files are stored by the user device 200 in step S300. This step S300 includes steps S310 to S330, which will be described in more detail below.

The network driver connection module 255 of the controller 250 of the user device 200 transmits a storage area request message for requesting the network storage area to the central server 100 through the communication unit 210 in step S310. Herein, the network driver connection module 255 performs a function of the network file system driver.

When receiving the storage area request message from the user device 200 through the communication module 110, the file centralization management module 133 of the control module 130 of the central server 100 allocates an available network disk among the plurality of network disks of the storage module 120. Then, the file centralization management module 133 transmits the link (or address) of the allocated network disk to the user device 200 through the communication module 110 in step S320.

Accordingly, the network driver connection module 255 of the controller 250 of the user device 200 may receive the link (or address) of the network disk through the communication unit 210, which is allocated and transmitted through the communication unit 210. Then, the network driver connection module 255 connects the corresponding network disk through the link (or address) of the network disk in step S330. Accordingly, the local storage prevention module 253 of the controller 250 may store the file of the application included in the program list and the file having the extension included in the extension list in the connected network disk with reference to the network driver connection module 255.

Meanwhile, when the file is stored in the network disk by the user device 200, the file centralization management module 133 backs up the stored files at a predetermined cycle and stores with different versions thereof. In addition, when the file stored in the network disk is deleted or modified, the file centralization management module 133 recovers or restores the deleted or modified file to a previous version of the file.

As described above, according to the embodiment of the present invention, by allowing all files generated in the user device 200 to be stored in the network storage area where security is maintained, that is, the network disk, it is possible to fundamentally block the confidential company information from being leaked.

Meanwhile, the above-described method according to the embodiment of the present invention may be implemented in a program command form which may be performed through various means for processing information to be recorded in a storage medium. Herein, the storage medium may include program commands, data files, data structures, and the like alone or in combination thereof. The program command recorded in the storage medium may be specially designed and configured for the present invention, or may be publicly known to and used by those skilled in the software field. Examples of the storage medium include magnetic media such as a hard disk, a floppy disk, and a magnetic tape, optical media such as a CD-ROM and a DVD, magneto-optical media such as a floptical disk, and a hardware device which is specifically configured to store and examples of the program command such as a ROM, a RAM, a flash memory and the like. An example of the program command includes a high-level language code executable by a device electrically processing information, for example, a computer by using an interpreter, and the like, as well as a machine language code generated by a compiler. The hardware device may be configured to be operated with one or more software modules in order to perform the operation of the present invention, and an opposite situation thereof is available.

While the present invention has been described with reference to several preferred embodiments, the present invention is not limited to the above-described exemplary embodiments, and it will be understood by those skilled in the art that various modifications and variations may be made within the detailed description of the invention and accompanying drawings without departing from the scope of the present invention as defined by the appended claims, as well as these modifications and variations should be included in the scope of the present invention according to doctrine of equivalents.

DESCRIPTION OF REFERENCE NUMERALS

100: Central server
10: Communication module
120: Storage module
130: Control module
131: LAN booting management module 133: File centralization management module
200: User device
210: Communication unit
220: Input unit
230: Display unit
240: Storage unit
250: Controller
251: LAN booting support module
253: Local storage prevention module
255: Network driver connection module

The invention claimed is:

1. A central server for local area network (LAN) booting environment-based file security and centralization, the central server comprising:

a storage memory device configured to store a plurality of operating system images;

a communication processor configured to communicate with a user device; and a LAN booting management processor configured to, when receiving a LAN booting start request message from the user device through the communication processor, select an operating system image usable in the user device among the plurality of operating systems according to user device information, and transmit the selected operating system image to the user device through the communication processor, wherein the storage memory device comprises at least one of a program list that allows the user device to block a function of leaking information among functions of an application belonging to the program list, and an extension list that allows the user device to block information of a file having an extension included in the extension list from being leaked, and further comprising a file centralization management processor configured to, when receiving the security list request message from the user device through the communication processor, transmit at least one of the program list and the extension list corresponding to the user device to the user device through the communication processor.

2. The central server according to claim 1, wherein the storage memory device comprises a plurality of network disks, and wherein the file centralization management processor is further configured to, when receiving a storage area request message from the user device through the communication processor, allocate an available network disk among the plurality of network disks, transmit a link of the allocated network disk to the user device through the communication processor, and connect the central server with the user device through the link of the allocated network disk so that a file generated in the user device is stored in the allocated network disk.

3. The central server according to claim 2, wherein the file centralization management processor backs up the file stored in the network disk at a predetermined cycle with different versions, and when the file stored in the network disk is deleted or modified, restores or restores the deleted or modified file to a previous version of the file.

4. A user device for local area network (LAN) booting environment-based file security and centralization, the user device comprising:

a communication processor configured to communicate with a central server;

a LAN booting support processor configured to, when receiving an operating system image from the central server through the communication processor, perform booting by using the received operating system image; and a local storage prevention processor configured to, when receiving at least one of a program list and an extension list through the communication processor after the booting is completed, block a function of leaking information among functions of an application belonging to the program list, or block information of a file having an extension included in the extension list from being leaked, wherein the local storage prevention processor blocks a file of an application included in the program list or the file having the extension included in the extension list from being stored in an area other than a network storage area, blocks a clipboard copy and a screen capture of the application included in the program list or the file having the extension included in the extension list, blocks a function of attaching or transmitting the file or a link of the file by the application included in the program list, or blocks the file having the extension included in the extension list or the link of the file from being attached or transmitted.

5. The user device according to claim 4, wherein the local storage prevention processor performs file I/O filtering in a kernel mode to block information leakage through a function of the application included in the program list, or block information leakage of the file having the extension included in the extension list.

6. The user device according to claim 4, further comprising a network driver connection processor configured to, when receiving a link of a network disk from the central server through the communication processor after the booting is completed, connect the user device to the network disk through the link of the received network disk so that a file generated in the user device is stored in the connected network disk.

7. The user device according to claim 6, wherein the network driver connection processor connects the user device with the network disk to which a distributed file system dedicated to the network driver connection processor is applied.

8. A method for local area network (LAN) booting environment-based file security and centralization of a central server, the method comprising:

receiving a LAN booting start request message from a user device;

selecting an operating system image usable in the user device among a plurality of operating systems according to user device information; and transmitting the selected operating system image to the user device, after the step of transmitting, when receiving a security list request message from the user device, transmitting at least one of a program list and an extension list to the user device, so as to block a function of leaking information among functions of an application belonging to the program list by the user device, or block information of a file having an extension included in the extension list from being leaked by the user device.

9. The method according to claim 8, further comprising: after the step of transmitting, when receiving a storage area request message from the user device, allocating an available network disk among the plurality of network disks, and transmitting a link of the allocated network disk to the user device; and connecting the central server with the user device through the link of the allocated network disk so that a file generated in the user device is stored in the allocated network disk.

10. The method according to claim 9, further comprising: after the connecting step, backing up the file stored in the network disk at a predetermined cycle with different versions; and when the file stored in the network disk is deleted or modified, recovering or restoring the deleted or modified file to a previous version of the file.

11. A method for local area network (LAN) booting environment-based file security and centralization of a user device, the method comprising:
receiving an operating system image from a central server;
perform booting by using the received operating system image;
receiving at least one of a program list and an extension list after the booting is completed; and
blocking a function of leaking information among functions of an application belonging to the program list, or block information of a file having an extension included in the extension list from being leaked,
wherein the blocking step blocks a file of an application included in the program list or the file having the extension included in the extension list from being stored in an area other than a network storage area,
blocks a clipboard copy and a screen capture of the application included in the program list or the file having the extension included in the extension list,
blocks a function of attaching or transmitting the file or a link of the file by the application included in the program list, or
blocks the file having the extension included in the extension list or the link of the file from being attached or transmitted.

12. The method according to claim 11, wherein the blocking step performs file I/O filtering in a kernel mode to block information leakage through a function of the application included in the program list, or block information leakage of the file having the extension included in the extension list.

13. The method according to claim 11, further comprising: after the step of performing booting,
receiving a link of a network disk from the central server;
connecting the user device to the network disk through the received link of the network disk; and
when a file is generated in the user device, storing the generated file in the connected network disk.

14. The method according to claim 13, wherein the connecting step comprises installing a network driver connection software, which is a network file system driver, to connect the user device with the network disk to which a distributed file system dedicated to the network driver connection software is applied.

15. A non-statutory computer readable recording medium recorded with a program for performing a method for local area network (LAN) booting environment-based file security and centralization of a central server,
the method comprising:
receiving a LAN booting start request message from a user device;
selecting an operating system image usable in the user device among a plurality of operating systems according to user device information; and
transmitting the selected operating system image to the user device,
after the step of transmitting,
when receiving a security list request message from the user device, transmitting at least one of a program list and an extension list to the user device, so as to block a function of leaking information among functions of an application belonging to the program list by the user device, or block information of a file having an extension included in the extension list from being leaked by the user device.

16. A non-statutory computer-readable recording medium recorded with a program for performing a method for local area network (LAN) booting environment-based file security and centralization of a user device,
the method comprising:
receiving an operating system image from a central server;
perform booting by using the received operating system image;
receiving at least one of a program list and an extension list after the booting is completed; and
blocking a function of leaking information among functions of an application belonging to the program list, or block information of a file having an extension included in the extension list from being leaked,
wherein the blocking step blocks a file of an application included in the program list or the file having the extension included in the extension list from being stored in an area other than a network storage area,
blocks a clipboard copy and a screen capture of the application included in the program list or the file having the extension included in the extension list,
blocks a function of attaching or transmitting the file or a link of the file by the application included in the program list, or
blocks the file having the extension included in the extension list or the link of the file from being attached or transmitted.

* * * * *